US005451415A

United States Patent [19]

Pera et al.

[11] Patent Number: 5,451,415

[45] Date of Patent: Sep. 19, 1995

[54] METHOD OF DEJUICING HARVESTED GRAPES

[75] Inventors: Didier Pera, Montblanc; Jean Pera, Cap D'Agde, both of France

[73] Assignee: Somavi, France

[21] Appl. No.: 269,151

[22] Filed: Jun. 30, 1994

Related U.S. Application Data

[62] Division of Ser. No. 164,637, Dec. 9, 1993, Pat. No. 5,355,785.

[30] Foreign Application Priority Data

Aug. 12, 1991 [FR] France ................................ 91 10240

[51] Int. Cl.[6] ................................ A23L 2/04

[52] U.S. Cl. ................................ 426/489; 426/495; 99/495; 99/513; 100/116; 100/211

[58] Field of Search ................................ 426/489, 495; 99/495, 99/510, 509, 513; 100/116, 211, 125

[56] References Cited

U.S. PATENT DOCUMENTS 4,106,404 8/1978 Schmid ................................ 100/211 X
4,438,690 3/1984 von Allovorden ................................ 100/211 X
4,513,659 4/1985 Braun ................................ 100/211 X
4,607,570 8/1986 Hauser ................................ 99/495 X
5,081,921 1/1992 Gregoire ................................ 100/211 X

FOREIGN PATENT DOCUMENTS 2246384 10/1973 France .
2524112 12/1976 Germany .
3440558 5/1986 Germany ................................ 99/495

*Primary Examiner*—Donald E. Czaja
*Assistant Examiner*—Milton I. Cano
*Attorney, Agent, or Firm*—Remy J. VanOphem; John VanOphem

[57] ABSTRACT

A method for dejuicing grapes uses a dejuicer comprises a closed tank provided with a dejuicer grid and an inflatable membrane in the tank which is pressurized to force juice out of the harvested grapes through the grid. A conveyor in the tank remove the dejuicer grapes from the tank. Harvested grapes are placed in said tank and the juice is allowed to flow naturally. The inflatable membrane mounted in the tank is then pressurized to force out further juice through the grid and the juice is collected from the tank. The membrane is then depressurized and the tank is emptied by actuating the conveyor.

6 Claims, 2 Drawing Sheets

METHOD OF DEJUICING HARVESTED GRAPES

This is a division, of application Ser. No. 08/164,637 filed Dec. 9, 1993, now U.S. Pat. No. 3,355,785.

BACKGROUND OF THE INVENTION

The invention concerns the dejuicing of harvested grapes.

It is known that so-called "static" dejuicing is effected by placing the harvested grapes in a tank having a grid at the bottom through which the juice is allowed to flow naturally. This removes the first 30 to 50% of the liquid content of the harvested grapes.

Sometimes additional, so-called "dynamic" dejuicing is then employed in which the harvested grapes are moved along a grid, usually by an endless screw. Approximately 70 to 80% of the initial liquid content of the harvested grapes is removed by static dejuicing followed by dynamic dejuicing.

To extract more than this 70 to 80% of the juice, instead of further dejuicing an extremely vigorous mechanical pressing action is applied to the harvested grapes to obtain the so-called "press juice", as opposed to the so-called "juice from dejuicing" obtained by dejuicing.

The invention is directed to the production of a high-quality juice from dejuicing with a high yield using a simple and easy to use dejuicer.

SUMMARY OF THE INVENTION

The present invention proposes a dejuicer for harvested grapes embodying a closed tank provided with a dejuicer grid; a membrane disposed in the tank, which is adapted to be pressurized to force dejuicing of the harvested grapes through the grid; and conveyor means disposed in the tank to remove the dejuiced grapes from the tank.

When the dejuicer in accordance with the invention is employed by first allowing the juice to flow naturally and then by forcing the flow by means of the membrane, the final percentage extraction is comparable with that achieved by static dejuicing followed by dynamic dejuicing, that is to say a high yield.

By employing forced static dejuicing rather than dynamic dejuicing all of the juice is extracted without masticating the harvested grapes, the result of which is to produce a particularly clear, that is to say very high quality, juice.

The dejuicer in accordance with the invention is simple and convenient to use, not only because filling the tank and extracting the juice do not pose any problems but also because the dejuicer has built-in conveyor means which merely need to be actuated when all the juice extraction operations have been finished to remove the dejuiced grapes from the tank.

According to preferred features of the invention the conveyor means are disposed against a wall above which is the lowest part of the interior volume of the tank.

The harvested grapes introduced into the tank therefore cover the conveyor means, which are in the bottom part, the wall against which they are placed supporting the conveyor means to assist them to withstand, in addition to the weight of the harvested grapes, the additional force due to the pressurization of the membrane. The membrane is additionally isolated from the conveyor means by the harvested grapes so that there is no risk of it being damaged by the edges of the conveyor means. This arrangement of the conveyor means is, therefore, advantageous from the point of view of the reliability and the durability of the dejuicer.

According to other preferred features of the invention, the dejuicer includes dejuicing recovery means which communicate with the interior volume of the tank above the lowest part of the interior volume.

The juice in the tank up to a certain height above its lowest part will, therefore, not be recovered as juice from dejuicing, which is favorable to the quality of the juice obtained from dejuicing because it will not include the sediment usually found in the tank bottom.

According to other preferred features favorable to the simple, reliable and economical nature of the dejuicer the tank has an interior volume delimited by a solid wall above which is the lowest part of the interior volume of the tank; and by a dejuicer grid on each side above the solid wall, behind which is a juice from the dejuicing recovery chamber.

The conveyor means may embody one endless screw or two endless screws separated by a projecting portion of the wall.

The membrane forms a closed bag and is suspended from a rod disposed longitudinally in the upper part of the interior volume of the tank; the membrane is supplied with pressurizing agents through a hollow rod; and the membrane is elastic.

The invention also proposes a method of dejuicing harvested grapes using a dejuicer as defined above wherein the harvested grapes are placed in the tank; the juice is allowed to flow out naturally; the membrane is pressurized in the tank to force juice to flow through the grid; the membrane is depressurized; and the tank is emptied by actuating the conveyor means.

According to preferred features of the present invention, in some kinds of vinification, after the harvested grapes are placed in the tank they are allowed to macerate there before extraction of the juice is started.

This causes pellicular maceration which by virtue of the prolonged contact between the grape skin and the liquid enables extraction of important flavoring agents contained in the grape skin. With some types of grapes this further improves the quality of the juice obtained from dejuicing.

Objects, features and advantages of the invention will become apparent from a reading of a description of one embodiment thereof when taken in conjunction with the highly diagrammatic drawings appended hereto.

DETAILED DESCRIPTION OF THE PREFERRED EMBODIMENT

Figure 1:
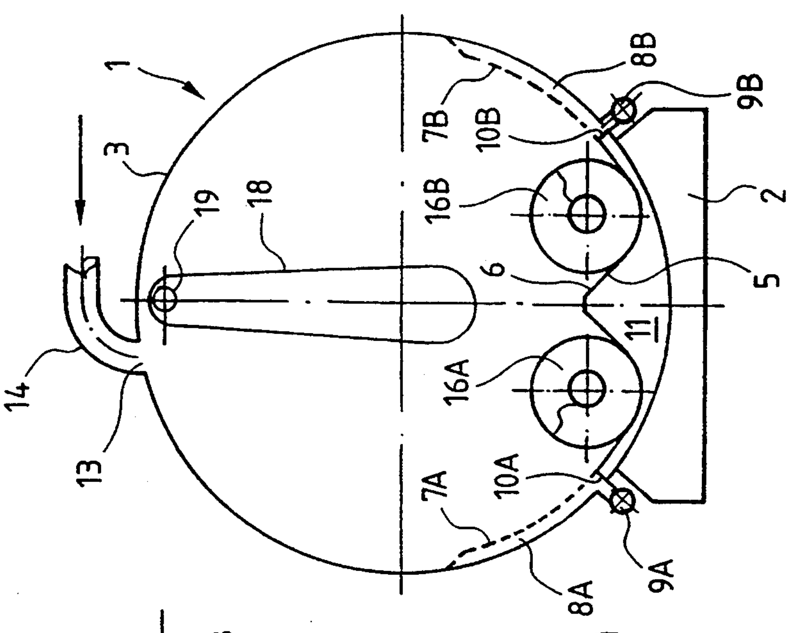
FIG. 1 is an elevational view in transverse cross section of an empty dejuicer in accordance with the invention.

As shown in the figures, a dejuicer according to the present invention has a generally cylindrical closed tank 1 with a horizontal axis and feet 2 resting on the ground.

The tank has a cylinder lateral wall 3 joined at each end to a respective transverse end wall 4A and 4B. A solid wall 5 delimiting two longitudinal channels separated by a protruding portion 6 is attached between the end walls 4A and 4B and above the lower portion of the wall 3, the lowest portion of the interior volume of the tank corresponding to the bottom of each of the channels. On each side of the wall 5, to a certain height, the interior volume of the tank is also delimited by a respective dejuicer grid 7A and 7B attached between the end walls 4A and 4B and substantially parallel to the lateral wall 3. Above the grids 7A and 7B the interior volume of the tank is delimited by the lateral wall 3. The space between the grids 7A and 7B and the lateral wall 3 defines chambers 8A and **8*b*, respectively, whose bottoms are connected to dejuicing recovery pipes 9A and 9B, respectively, each of which are fitted with a shut-off valve (not shown). Walls 10A and 10B isolate the chambers 8A and 8B, respectively, from the space 11 situated between the walls 3 and 5. At each end of the lateral channels delimited by the wall 5 is a trapdoor 12 in the wall 4A for removing the pomace. Two openings 13 in the upper part of the wall 3, for loading the harvested grapes, are each connected to a respective feed pipe 14. A trapdoor 15 is disposed substantially at the center of the wall 4A** to provide access to the interior of the tank for installation and maintenance of its interior fittings.

Figure 2:
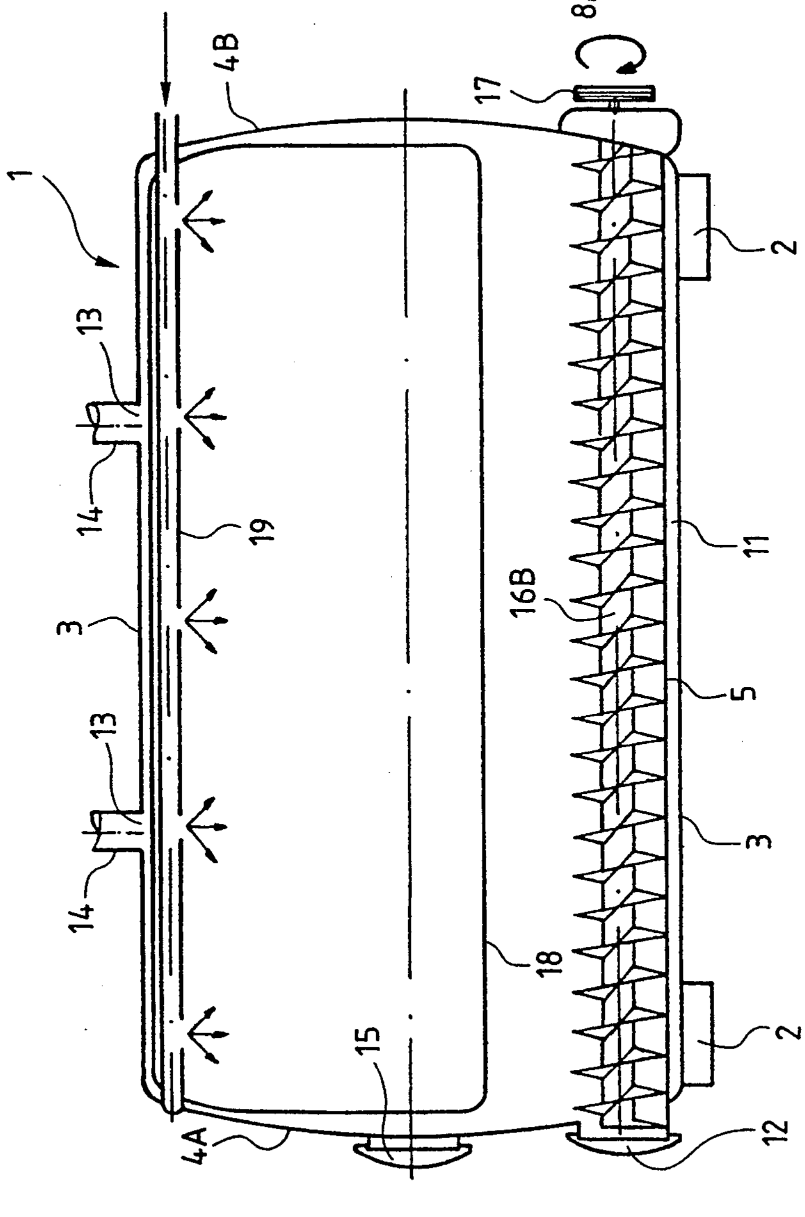
FIG. 2 is an elevational view in longitudinal cross section of the dejuicer.

Endless screws 16A and 16B are each located in a respective channel of the wall 5. At the same end of the tank 1 as the wall 4A, the endless screws 16A and 16B face the trapdoor 12. Each endless screw 16A and 16B has a shaft which extends beyond the wall 4B and is connected to a drive pulley 17 which is connected by a belt to a motor (not shown) and is adapted to rotate the endless screws 16A and 16B as shown by the arrow in FIG. 2.

A membrane 18, made from an elastic material in this embodiment, forms a closed bag and is suspended from a rod 19 disposed longitudinally in the upper part of the interior volume of the tank. The rod 19 is hollow (it is a tube) and supplies a pressurizing agent such as compressed air to the membrane. In this embodiment, (see FIG. 2) the rod 19 is inside the membrane 18 and is provided with five holes through which the pressurizing agent enters and leaves the membrane.

The operation of the dejuicer shown will now be described.

Figure 3:
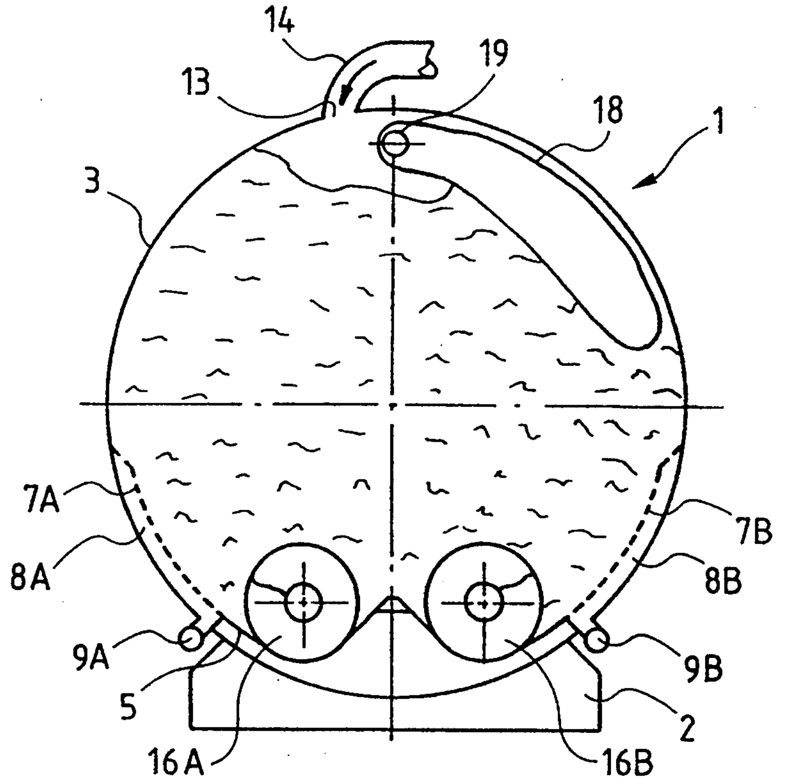
FIGS. 3 and 4 are views similar to FIG. 1, respectively, after the tank is filled with the harvested grapes and after the membrane is pressurized.

Starting with the tank 1 empty, as shown in FIG. 1, with the trapdoors 12 and 15 closed and the valves on the pipes 9A and 9B closed, the harvested grapes to be dejuiced are fed through the pipes 14 and the openings 13 into the interior volume of the tank 1 until they fill the tank, at the end of which operation the membrane 18 floats on top of the harvested grapes (see FIG. 3).

Either immediately, or after a few hours of maceration in the closed space, as defined by the interior volume of the tank, the removal of the resultant juice from the dejuicing extraction phase begins: the valves on the pipes 9A and 9B are opened and the resultant juice flows naturally, and after some time the flow rate decreases.

Figure 4:
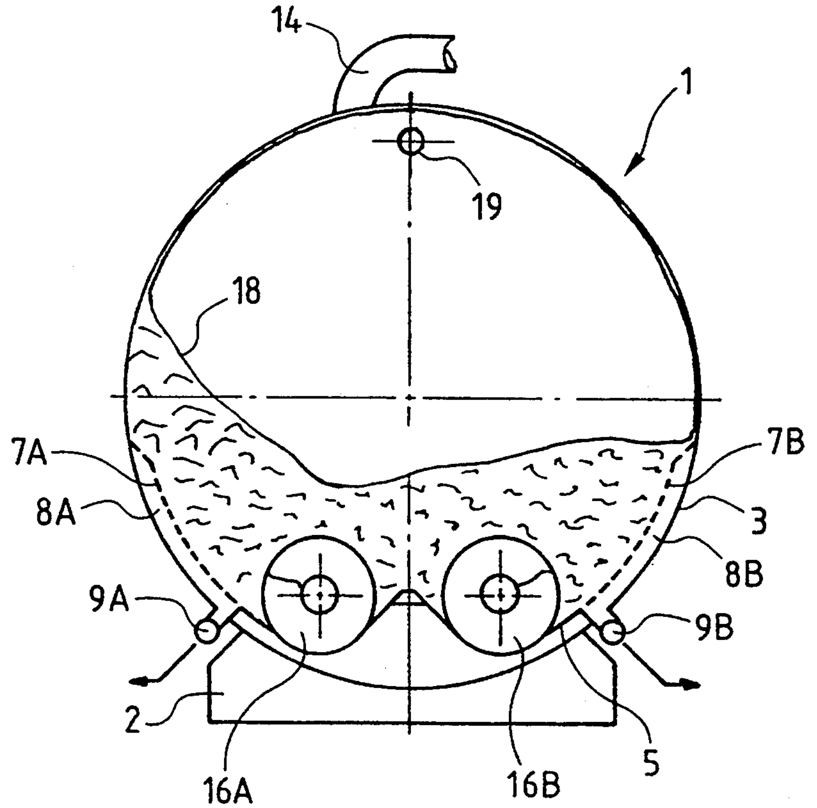

At this time, the pressurizing agent is fed into the membrane 18 causing it to inflate, and the grapes, already dejuiced naturally, are compressed (FIG. 4) which forces them to dejuice further, and the juice begins to flow again. After a while, the flow rate gradually decreases to zero and the compressed grapes block the grids 7A and 7B. This completes the juice extraction phase.

The membrane 18 is then depressurized, the trapdoors 12 are opened and the endless screws 16A and 16B are rotated to remove the dejuiced grapes, that is to say the pomace, from the tank. The membrane 18 reverts to its initial shape and position of its own accord because of its elasticity and because it is suspended from the rod 19.

Note that here the harvested grape feed openings 13 are offset to one side of the rod 19 which enables the membrane to remain above the harvested grapes (see FIG. 3).

In the example shown, it is beneficial to use two endless screws because of the diameter of the cylindrical wall 3, but in embodiments with different diameters a single endless screw or more than two endless screws may be used.

The endless screws function as conveyor means for the dejuiced grapes and are particularly suited to the dejuicer in accordance with the invention with regard to both ruggedness and efficiency. However, in some embodiments, especially of parallelepiped shape, the endless screws may be replaced with transverse bars driven by endless chains, scraping the bottom of the interior volume of the tank.

While the invention has been described in terms of a preferred embodiment, it is apparent that other forms could be adopted by one skilled in the art. Accordingly, the scope of the invention is to be limited only by the following claims.

What is claimed is:

1. A process for dejuicing grapes comprising the steps of:

selecting an immobile tank having an inlet opening and an outlet opening and an inner surface defining an internal chamber;

mounting an inflatable membrane within said internal chamber of said immobile tank;

mounting at least one grape removing conveyor means in a bottom portion of said internal chamber:

disposing at least one dejuicing grid within said immobile tank at a point above a bottom of said immobile tank so that an upper surface of said grid forms a bottom portion of said inner surface of said tank;

feeding said grapes into said immobile tank through said inlet opening such that said grapes collect below said membrane and over said grape removing conveyor means;

inflating said membrane by introducing a pressurizing agent thereby applying pressure to said grapes such that juice is produced said juice flowing through said at least one dejuicing grid:

collecting said juice dejuiced from said grapes from said immobile tank;

keeping said at least one grape removing conveyor means inoperative prior to and during said step of inflating said membrane: and removing said dejuiced grapes from said bottom portion of said immobile tank after depressurizing said membrane, and after said step of collecting said juice by activating said at least one grape removing conveyor means.

2. The process as set forth in claim 1 further comprising the step of allowing juice to flow through said at least one dejuicing grid without exerting force on said grapes, between said step of feeding said grapes and said step of inflating said membrane.

3. The process as set forth in claim 1 further comprising the step of macerating said grapes within said immobile tank prior to allowing any juice to leave said immobile tank.

4. The process set forth in claim 1 wherein said step of selecting an immobile tank comprises the step of selecting a tank having a top, a bottom, and a pair of ends, with said inlet opening on said top and said outlet opening in one of said ends.

5. The process as set forth in claim 1 wherein said step of mounting an inflatable membrane comprises the step of mounting said membrane suspended in a top portion within said internal chamber of said immobile tank.

6. A process for dejuicing grapes comprising the steps of:

selecting an immobile tank having a top, a bottom, a pair of ends, an inlet opening in said top and an outlet opening in one of said ends, said immobile tank having an inner surface defining an internal chamber;

mounting an inflatable membrane within said immobile tank, said membrane being suspended in a top portion within said internal chamber of said immobile tank;

disposing at least one dejuicing grid within said immobile tank at a point above said bottom of said immobile tank;

feeding said grapes into said immobile tank through said inlet opening in said top such that said grapes collect below said membrane;

inflating said membrane by introducing a pressurizing agent, thereby applying pressure to said grapes such that further juice is produced, said juice flowing through said at least one dejuicing grid;

collecting said juice, dejuiced from said grapes, from said immobile tank; and removing said dejuiced grapes from said bottom of said immobile tank after depressurizing of said membrane.

* * * * *

UNITED STATES PATENT AND TRADEMARK OFFICE

CERTIFICATE OF CORRECTION

PATENT NO. : 5,451,415

DATED : September 19, 1995

INVENTOR(S) : Didier Pera and Jean Pera

It is certified that error appears in the above-indentified patent and that said Letters Patent is hereby corrected as shown below:

Title page, item [57], lines 1 and 2, delete "comprises" insert -- constituted by --.

Title page, item [57], line 5, delete "remove" insert ---- removes ----, same line, delete "dejuicer" insert ---- dejuiced ----.

Title page, item [57], line 6, delete "said" insert ---- the ----.

Column 1, line 5, delete "3,355,785" insert ---- 5,355,785 ----.

Column 4, line 50, after "produced" insert ---- , ----.

Column 4, line 51, delete ":" insert ---- ; ----.

Column 4, line 56, delete ":" insert ---- ; ----.

Signed and Sealed this

Thirteenth Day of February, 1996

Attest:

BRUCE LEHMAN

*Attesting Officer* — *Commissioner of Patents and Trademarks*